United States Patent Office 3,437,418
Patented Apr. 8, 1969

3,437,418
**PROCESS FOR DYEING FIBERS OF POLYETHYL-
ENE TEREPHTHALATE AND BLENDS THEREOF
WITH COTTON WITH MONOAZO DYESTUFFS**
William G. Huey, Nassau, William H. Armento, Albany,
and Lester N. Stanley, Delmar, N.Y., assignors to GAF
Corporation, a corporation of Delaware
No Drawing. Filed Apr. 16, 1965, Ser. No. 448,879
Int. Cl. D06p 3/24, 1/04
U.S. Cl. 8—21
3 Claims

ABSTRACT OF THE DISCLOSURE

A process for dyeing polyester containing textiles using a novel diazo-dyestuff with poracreosol as a coupler.

This invention relates to a class of novel dyes, to processes for manufacturing and using the same and to products so produced and relates more particularly to new diazo-dyestuffs for use in the coloring of articles, particularly the filamentary textile articles including at least a portion of fibers of a polyester resin.

Polyester condensation products are among the most difficult synthetic plastic materials to color effectively, particularly textile articles formed of polyethylene terephthalate and the like or blends of the same. Although the present invention is useful for coloring of articles made from polyester resins, in the textile art such products have generally been limited to polyethylene terephthalate, that is, the poly-condensation products of di-acids with di-alcohols specifically, terephthalic acid with ethylene glycol. Commercially, such material is available under tradenames "Dacron," "Tergal," and "Terylene" among others.

In addition to textile materials formed entirely of polyester synthetic plastic materials, the dyestuffs of the instant invention are especially valuable for use with mixed polyester-cotton materials and similar blends.

One general procedure useful for the coloring of polyesters is the "Thermosol" technique which is described in detail in the American Dyestuff Reporter, 42, pages 1 and 2 (1953). According to this procedure the dyestuff is dispersed as a paste which is padded onto the plastic being dyed, the article being subjected to both elevated temperature and relatively high pressure, and the paste being then removed. Generally, textile materials treated in this manner are contacted with the dyestuff dispersion at a temperature from about 140 to 180° F., dried and then subjected to a temperature of from about 390 to 440° F. for approximtely ½ to 2 minutes.

The increased use for polyester fibers in recent years has led to a demand for improved dyeing of the same. Conventional dyes known heretofore, that is, those previously found suitable for other synthetic materials, have not been as satisfactory for polyesters. These dyestuffs suffer from lack of wash fastness and dry cleaning fastness and are not sufficiently resistant to fading and sublimation. Many of the newer dyestuffs particularly tailored to polyester fibers still suffer from poor light fastness and those which have been able to improve on the light fastness are usually subject to the drawback of insufficient resistance to sublimation at high temperatures. The problem is of particular importance since it prevents the use of high temperature dyeing processes such as the Thermosol defined hereinabove.

Particularly difficult heretofore has been the production of yellow dyes which tend to sublime less on high temperature treatment than other dyes. Thus, it becomes increasingly important to find yellow dyes which will dye polyester fibers in bright yellow shades of good light and sublimation fastness.

Although the novel dyestuffs of this invention are particularly useful for the more difficultly dyed polyester condensation products, it is to be understood that they are also of value for use as disperse dyes for other synthetic plastic materials such as cellulose acetate, cellulose, cellulose triacetate, polyamides, polyvinyl, polyacrylic and polyurethane films and fibers and the like.

It is therefore a primary object of this invention to provide dyestuff compositions and procedures particularly adapted for manufacturing and use for the same which are free from the foregoing, and other, disadvantages.

Another important object of this invention is the provision of a dyestuff which will produce a strong, bright yellow coloration of good build-up having desirable fastness to both light and sublimation.

A further object of the instant invention is the provision of a diazo-dyestuff which is relatively simple and inexpensive to manufacture utilizing well known prior techniques.

Yet a further object of the invention is the provision of a dyestuff composition which may be utilized in a relatively simple manner to color articles composed, at least in part, of synthetic plastic materials with a minimum of fading of the product after extended subjection to light or elevated temperatures.

A still further object of the instant invention is the provision of procedures for dying polyester condensation products with a color which is strong and fast.

Other and further objects reside in the specific characteristics of the dyestuff compositions and the manipulative steps of the procedures for manufacturing and using the same.

Still other objects will in part be obvious and in part be pointed out as the description of the invention proceeds.

Consistent with the above objectives, a dyestuff composition in accordance with the instant invention has the following structural formula:

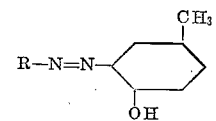

wherein X is a substituent selected from the group consisting of hydrogen and methyl and R is a moiety selected from the group consisting of 4'-amino-2-furanecarboxanilide, N-(4'-aminophenyl) phthalimide and 2-hydroxy-4'-aminobenzanilide.

In carrying out the process of this invention one mole of an amine of the formula RNH$_2$ selected from the group consisting of 4' - amino - 2 - furanecarboxanilide, N-(4'-aminophenyl) phthalimide and 2-hydroxy-4'-aminobenzanilide is diazotized in the usual manner by stirring in an acidic aqueous solution, cooling to from 15 to 25° C. and then treating with nitrous acid in the form generally of sodium or potassium nitrite. The diazo solution is reacted with an alkaline aqueous solution of a coupler selected from the group consisting of p-cresol and 3,4-xylenol. Preferably, approximately 1 mole of the coupler is dissolved in water which is rendered alkaline by the addition of sodium hydroxide. Somewhat smaller or larger quantities of coupler than a 1 to 1 molar ratio may be used, up to about 10 percent in excess. The diazo solution is preferably run into the coupler solution while maintaining the temperature of the reaction below about 25° C. and the pH of the reaction at from about 8.5 to 9. The dyestuff thus obtained is filtered and washed, preferably dispersing the same before drying. Dispersal is accomplished by intimately mixing the dye wet paste with the desired amount of a suitable dispersing agent such as Polyfon H (sodium ligninsulfonate), Leonil SA (anionic naphthalenesulfonate) and the like.

In order to better understand the instant inventive concept, the following examples are set forth, which examples are to be considered merely as exemplary and not limiting.

Example 1

Approximately 48 g. of 4'-amino-2-furanecarboxanilide is intermixed with 500 cc. of water and 63 cc. of hydrochloric acid 20° Bé., the solution being heated to about 95° C. and then cooled. At a temperature of about 15–25° C. 44 cc. of a 31.5 percent solution of sodium nitrite is added. Before coupling, excess nitrite may be removed by treatment with sulfamic acid and any insolubles may be removed by filtration.

Approximately 30 cc. of p-cresol is dissolved in 165 cc. of water containing about 28 cc. of sodium hydroxide (30 percent by weight solution) and 20 g. of soda ash. The diazo solution described above is run into this coupler solution while maintaining a pH of 8.5–9 by addition of soda ash as needed with care being taken that the temperature remains below 25° C. After coupling has taken place, the product is filtered and washed with dilute sodium hydroxide solution. It is resludged in 3700 cc. of water, made Clayton alkaline, filtered and washed with water. The dyestuff obtained has the formula:

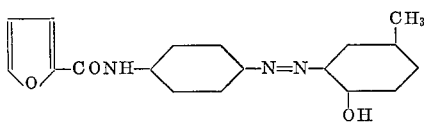

Approximately 22 g. of the above dyestuff, 20 g. of Polyfon H (sodium ligninsulfonate) and 4 cc. of Nekal WS–25 (sodium alkylnaphthalenesulfonate) are wet down in a mixer with water to give a thick doughy mass. The water is evaporated to viscous milling viscosity, and the resultant material is viscous milled for 1½ hours, water being added as needed. The product is then dried to a powder.

About 2 ounces of the so-treated dyestuff is dispersed in 83 cc. of warm water and poured into a solution containing 0.2 g. of Keltex gum (an alginic thickening agent) and 1 cc. of Nekal NF (sodium alkylnaphthalenesulfonate). The solution is made up to a gallon with water. Dacron polyester material is padded with this at 160° F., dried and cured at 425° F. for 90 seconds. The material is soaped at the boil for 5 minutes, washed and dried. A bright yellow shade is obtained which has good light fastness and excellent sublimation properties.

Example 2

Approximately 54 g. of N-(4-nitrophenyl) phthalimide (prepared by heating equimolar amounts of phthalic anhydride with p-nitroaniline in dichlorobenzene solution for 14 hours, steam distilling off the solvent, filtering and resludging) is fed slowly into a slurry consisting of 250 cc. of dimethylformamide, 50 cc. of water, 35 g. of iron borings and 3 cc. of hydrochloric acid 20° Bé. which had previously been heated to the reflux. The mixture is refluxed overnight, made Brilliant Yellow alkaline with soda ash, treated with Nuchar (activated carbon) and filtered. The cake is resludged with hot dimethylformamide, cooled and filtered. The paste weight is 60 g.

The mother liquor is diluted with water and filtered, yielding an additional paste weight of 60 g.

The two pastes are combined and mixed with 100 cc. of water and 45 cc. of hydrochloric acid 20° Bé. It is filtered and cooled to 15–20° C. Approximately 38 cc. of sodium nitrite solution is added at 15–25° C. Before coupling excess nitrite is removed by treatment with sulfamic acid.

About 25 cc. of p-cresol is dissolved in 165 cc. of water containing 23 cc. of 30 percent sodium hydroxide and 20 g. of soda ash. The diazo solution described above is run into this coupler solution maintaining a pH of 8.5–9 by addition of soda ash as needed and maintaining the temperature below 25° C. After coupling has taken place, the product is filtered and washed with dilute sodium hydroxide solution. It is resludged in water, made Clayton alkaline, filtered and washed with water. The dye obtained has the formula:

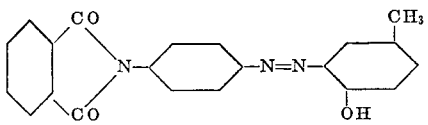

The dye is dispersed and a dyeing made as in Example 1. The product has fair light fastness, and very good fastness to sublimation.

Example 3

Approximately 50 g. of 4'-amino-2-hydroxybenzanilide is mixed with 500 cc. of water and 63 cc. of hydrochloric acid 20° Bé., heated to 95° C., and then cooled. At about 0–5° C., 41 cc. of a 31.5 percent sodium nitrite solution is added. Before coupling, excess nitrite is removed by treatment with sulfamic acid as in the previous examples.

Approximately 28 cc. of p-cresol is dissolved in 165 cc. of water containing 26 cc. of 30 percent sodium hydroxide and 20 g. of soda ash. The diazo solution is run into this coupler solution maintaining a pH of 8.5–9 by addition of soda ash as needed, and care being taken that the temperature remains below 25° C. After coupling has taken place, the product is filtered and washed with dilute sodium hydroxide solution. It is resludged in 3700 cc. of water, made Clayton alkaline, filtered, and washed with water. The dye obtained has the formula:

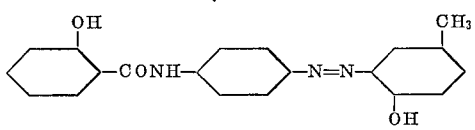

After dispersing and dyeing as in Example 1, a bright yellow product is obtained which has good light, wash and sublimation fastness.

Example 4

Approximately 11.4 g. of 4'-amino-2-hydroxybenzanilide at the hydrochloride is dissolved in 500 cc. of water and 5 cc. of hydrochloric acid by heating to 95° C. and cooling. To this is added at about 20° C. 10 cc. of sodium nitrite. After diazotization is complete, excess nitrite is destroyed by treatment with sulfamic acid.

About 6 g. of 3,4-xylenol is dissolved in 40 cc. of water containing 5 cc. of 30 percent sodium hydroxide and 4 g. of soda ash. The diazo solution described above is run into this coupler solution while maintaining a pH of 8.5–9, care being taken that the temperature remains below 25° C. After coupling has taken place, the reaction product is filtered and washed with dilute sodium hydroxide solution. It is resludged in 700 cc. of water, made Clayton alkaline, filtered and washed with water. The dyestuff obtained has the formula:

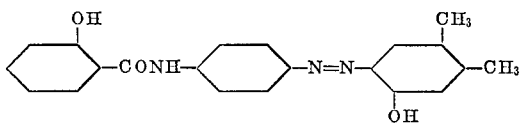

After dispersing and dyeing as in Example 1, a bright yellow dyeing of good build-up is obtained which has good wash, light and sublimation fastness.

It will now be seen that there are herein provided improved dyestuff compositions, procedures for their manufacture and use, and improved products produced thereby, particularly colored polyester filamentary materials, which satisfy all of the objects of the instant invention, and others, including many advantages of great practical utility and commercial importance.

Since many embodiments may be made of the instant inventive concept, and since many modifications may be made of the embodiments hereinbefore described, it is to be understood that all matter herein is to be interpreted merely as illustrative and not in a limiting sense.

We claim:

1. A process for dyeing an article composed of textile material at least in part polyester fibers comprising contacting said article at a temperature of from about 140–180° F., with a dispersion of a dyestuff of the formula:

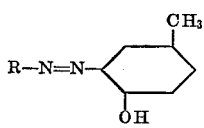

wherein R is a moiety selected from the group consisting of

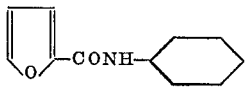

and

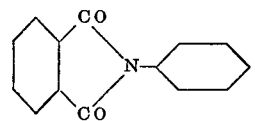

drying said textile material and subjecting said textile material to a temperature of from about 390–440° F., for approximately ½ to 2 minutes.

2. A process in accordance with claim 1 wherein said textile material includes at least a portion of fibers formed of polyethylene terephthalate.

3. The process in accordance with claim 2 wherein said textile material is a blend of polyethylene terephthalate and cotton fibers.

References Cited

UNITED STATES PATENTS 2,864,816  12/1958  Nicolaus et al. _____ 260—207
3,364,195  1/1968  Huey et al. _____ 8—41 X

OTHER REFERENCES

H. A. Lubs: The Chemistry of Synthetic Dyes and Pigments, pp. 670–671, 1955, Reinhold Publishing Corp., New York, N.Y.

NORMAN G. TORCHIN, *Primary Examiner.*

T. J. HERBERT, JR., *Assistant Examiner.*

U.S. Cl. X.R.

8—41, 55; 260—152